US009058944B2

(12) United States Patent
Woo

(10) Patent No.: US 9,058,944 B2
(45) Date of Patent: Jun. 16, 2015

(54) LIGHTING SYSTEM FOR ELECTRIC PARKING BRAKE SWITCH

(71) Applicants: Hyundai Motor Company, Seoul (KR); Kia Motors Corporation, Seoul (KR)

(72) Inventor: Jung Hoon Woo, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 92 days.

(21) Appl. No.: 13/869,440

(22) Filed: Apr. 24, 2013

(65) Prior Publication Data

US 2014/0177199 A1 Jun. 26, 2014

(30) Foreign Application Priority Data

Dec. 26, 2012 (KR) ........................ 10-2012-0153740

(51) Int. Cl.

*G01D 11/28* (2006.01)
*H01H 21/02* (2006.01)
*H01H 21/22* (2006.01)

(52) U.S. Cl.

CPC ....... *H01H 21/025* (2013.01); *H01H 2021/225* (2013.01)

(58) Field of Classification Search

CPC ........................ H01H 21/025; H01H 2021/225
USPC .......... 362/23.01, 23.04, 23.05, 23.07, 23.12, 362/23.14, 23.19, 37, 42, 459, 487–488, 362/495, 499, 509, 514, 520, 540–542; 340/457.3; 200/557, 502
See application file for complete search history.

(56) References Cited

U.S. PATENT DOCUMENTS

| | | | | |
|---|---|---|---|---|
| 5,403,984 | A * | 4/1995 | Ogawa | 200/517 |
| 5,865,302 | A * | 2/1999 | Suzuki et al. | 200/315 |
| 7,524,074 | B2 * | 4/2009 | Chery et al. | 362/26 |
| 8,651,042 | B2 * | 2/2014 | Kosemura et al. | 116/279 |
| 2009/0175049 | A1 * | 7/2009 | Lota | 362/488 |
| 2010/0128493 | A1 * | 5/2010 | Hipshier et al. | 362/459 |
| 2012/0262937 | A1 * | 10/2012 | Hayashi et al. | 362/520 |
| 2013/0213787 | A1 * | 8/2013 | Laicher et al. | 200/557 |
| 2013/0223042 | A1 * | 8/2013 | Kim et al. | 362/23.04 |

(Continued)

FOREIGN PATENT DOCUMENTS

| | | | | |
|---|---|---|---|---|
| DE | 102004036844 | A1 * | 3/2006 | H01H 23/30 |
| JP | 2012-018917 | A | 1/2012 | |
| JP | 2012018917 | A | 1/2012 | |
| KR | 10-2006-0075985 | A | 7/2006 | |

(Continued)

*Primary Examiner* — Anne Hines
*Assistant Examiner* — Jose M Diaz
(74) *Attorney, Agent, or Firm* — Mintz Levin Cohn Ferris Glovsky and Popeo, P.C.; Peter F. Corless

(57) ABSTRACT

Disclosed is a lighting system for an electric parking brake switch. The lighting system includes a panel in which an installation space and an operation space are formed at an upper portion thereof. In addition the system includes a switch that is installed in the installation space and is shaft coupled to perform pivotal motion. Furthermore, a prism is installed within the switch wherein one surface is exposed toward the operation space. The prism is configured to allow light which enters from underside bottom surface to pass therethrough and travel vertically upward after exiting from an upper surface, and to refract within thereof and then travel toward the operation space. Additionally, a light source is disposed at a lower end portion of the panel and is configured to emit light to the prism.

6 Claims, 4 Drawing Sheets

(56) References Cited

U.S. PATENT DOCUMENTS

| | | | | |
|---|---|---|---|---|
| 2014/0085918 | A1* | 3/2014 | Muller et al. | 362/514 |
| 2014/0157930 | A1* | 6/2014 | Schneider et al. | 74/473.3 |

FOREIGN PATENT DOCUMENTS

| | | | |
|---|---|---|---|
| KR | 10-2007-0073122 | A | 7/2007 |
| KR | 10-2011-0130248 | A | 12/2011 |

* cited by examiner

LIGHTING SYSTEM FOR ELECTRIC PARKING BRAKE SWITCH

CROSS-REFERENCE TO RELATED APPLICATION

This application claims under 35 U.S.C. §119(a) the benefit of Korean Patent Application No. 10-2012-0153740 filed Dec. 26, 2012, the entire contents of which are incorporated herein by reference.

BACKGROUND OF THE INVENTION

1. Field of the Invention

The present invention relates, in general, to an electric parking brake switch, and, more particularly, to a lighting system for an electric parking brake switch which includes a lighting device disposed in a space configured to operate an electric parking brake, to improve visibility of the electric parking brake switch during night driving.

2. Description of the Related Art

An Electric Parking Brake (EPB) switch is usually disposed on a panel such as an upper cover as illustrated in FIG. 1. The EPB switch is usually a push-pull type of switch with a rotary stroke of about 10° to 15°, and is configured to perform rotary motion when operated. An installation space 1*a* and an operation space 1*b* are disposed in the upper cover 1. A switch 2 is installed on a top portion of the operation space 1*b* and the user inserts a hand into the operation space 1*b* to operate the switch 2. A Light-Emitting Diode (LED) 3 is installed under the switch 2 to illuminate the switch 2.

In the related art described above, the manner in which the installation space and the operation space are partitioned, causing the light from the LED to illuminate only the operation space. The illumination facilitates locating the switch, but causes difficulty for locating the operation space especially at night because the light from the LED cannot reach the operation space since it is installed substantially directly under the switch 2.

Conventional systems that illuminate the switch, scatter light emitted to a switch using a bending portion. However, in technology both of the installation space and the operation space may not be illuminated with the one light source.

The foregoing is intended merely to aid in the understanding of the background of the present invention, and is not intended to mean that the present invention falls within the purview of the related art that is already known to those skilled in the art.

SUMMARY

Accordingly, the present invention provides a lighting system for an electric parking brake switch which improves visibility of the electric parking brake switch by illuminating an operation space configured to operate an electric parking brake with light from a light source which is configured to illuminate the electric parking brake switch at night or in substantially low lighting.

According to one aspect of the present invention, a lighting system for an electric parking brake switch, may include a panel with an installation space and an operation space disposed at an upper end portion and shaped as an elongated opening, a switch disposed in the installation space and shaft coupled to perform a pivotal motion, a prism disposed inside the switch wherein one surface of the prism is exposed to and faces the operation space to allow light, which enters from a bottom surface, to transmit through the prism, exits through an upper end surface of the prism, and vertically travels upward, and to allow the light to refract within the prism to travel toward the operation space, and a light source disposed at a lower end portion of the panel, wherein the light source is configured to emit the light.

The prism may have protrusions on one surface thereof which may be exposed toward the operation space. In this configuration, the light which is incident onto the protrusions may be configured to scatter and travel vertically toward the operation space.

A barrier layer may be disposed to partially surround the prism, wherein the barrier layer may surround the prism except for the upper end surface of the prism from which light emitted from the light source may be configured to exit, the lower end surface of the prism, and the surface of the prism which is exposed to and faces the operation space.

A hollow portion may be disposed in a body of the switch to communicate with an upper surface and a lower surface of the body of the switch, an installation aperture may face the operation space to communicate with the hollow portion, the prism may be inserted into the installation aperture to support the edges of the prism, and an upper end portion of the prism may protrude from the body of the switch and project into the operation space.

A reflective aperture may be formed to extend through the prism from the upper end surface to the lower end surface to allow light emitted from the light source to reflect within the reflective aperture and the light may then be emitted vertically. A parking symbol may be disposed at an upper portion of the prism, and an upper end portion of the reflective aperture may be formed to face the center of the parking symbol.

According to the present invention, the light emitted from the light source may be configured to illuminate the upper end portion of the switch and the interior of the operation space of the switch by passing through the prism. Therefore, the visibility of the operation space of the switch may be improved during night driving or substantially low lighting.

In addition, the light, which refracts while traveling through the prism, may be scattered by the protrusions to illuminate the operation space. The emitted light may substantially uniformly scatter within the operation space and substantially uniformly illuminate the interior of the operation space. The lighting system may function as mood lighting, improving aesthetics of vehicles. In addition, the operation space may be illuminated using a light source which has been used as lighting for a conventional switch.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, exemplary embodiments of the present invention will be described in detail with reference to the accompanying drawings.

Figure 1:
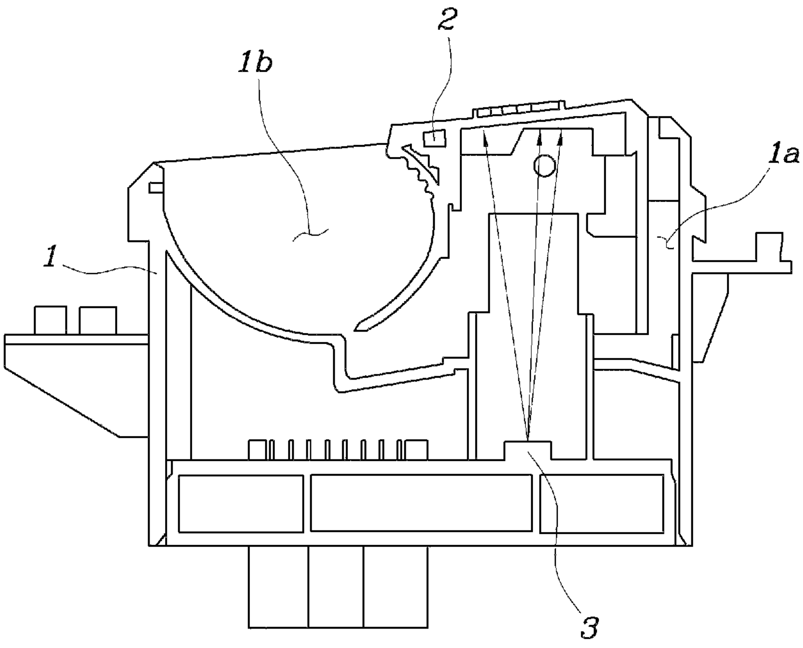
FIG. 1 is an exemplary diagram illustrating the structure of a lighting system for an electric parking brake switch according to a related art.
Figure 2:
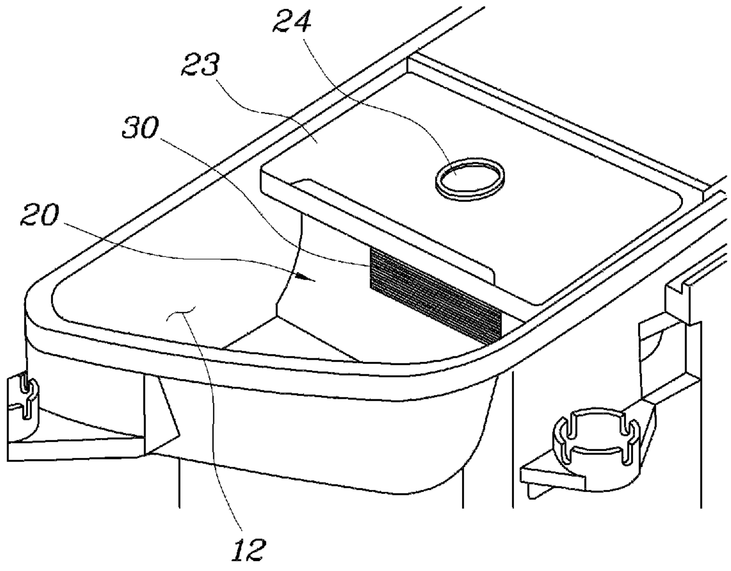
FIG. 2 is an exemplary diagram illustrating the external structure of a lighting system for an electric parking brake switch according to an exemplary embodiment of the present invention.
Figure 3:
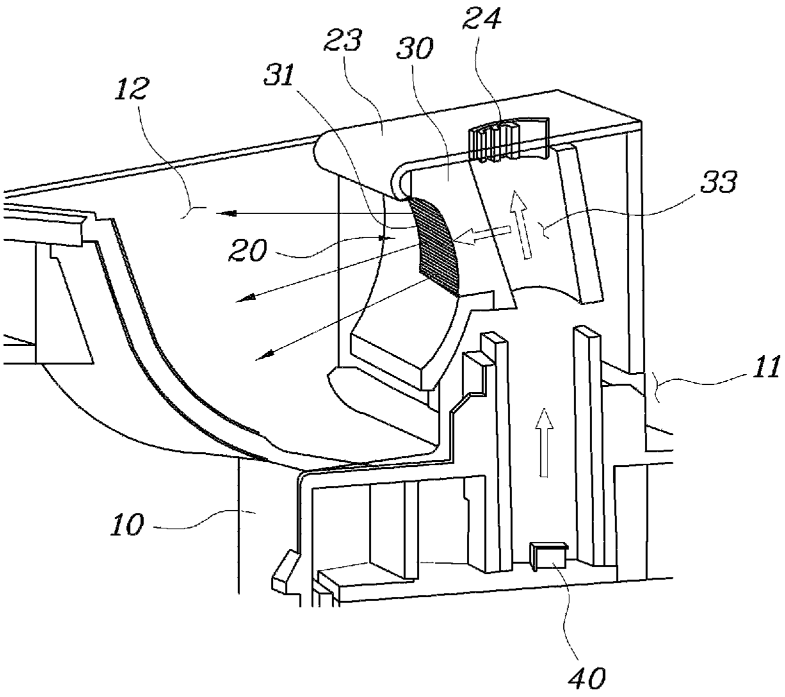
FIG. 3 is an exemplary diagram illustrating an assembled structure of the lighting system for the electric parking brake switch according to an exemplary embodiment of the present invention.

FIG. 2 is an exemplary diagram illustrating the external structure of an electric parking brake switch according to the present invention, and FIG. 3 is an exemplary diagram illustrating an assembled structure of a lighting system for an electric parking brake switch 20 according to the present invention. The lighting system for the electric parking brake switch 20 according to the present invention may include a panel 10, a switch 20, a prism 30, and a light source 40.

The structure of the lighting system for the electric parking brake switch 20 according to the present invention will be described in greater detail with reference to FIGS. 2 and 3. The structure may include the panel 10 in which an installation space 11 and an operation space 12, which are in the form of an elongated opening, are disposed at an upper end portion of the panel 10. The structure may further include the switch 20 disposed in the installation space 11. The switch 20 may be shaft coupled to perform pivotal motion. The prism 30 may be disposed within the switch 20. One surface of the prism 30 may be exposed toward the operation space 12 to allow light entering from underside bottom surface transmit through the body of the prism, and vertically travel upward after exiting an upper end surface of the prism. Furthermore, within the prism 30 the light entering from the bottom side may refract toward the operation space 12. The light source 40, which may be configured to emit light to the prism 30, may be disposed at a lower end portion of the panel 10.

In addition, the panel 10 may be an upper cover installed between the front seats of the vehicle. The installation space 11 and the operation space 12 may open at upper end portions thereof, and may be formed at the upper end portion of the panel 10. The installation space 11 and the operation space 12 may be connected through an elongated opening.

The switch 20 may be installed in the installation space 11 and may be shaft coupled to both side surfaces of the installation space 11 to allow the switch 20 to be operated to perform pivotal motion within an angular range of 10° to 15°. Furthermore, a knob 23 may be combined with an upper end portion of the switch 20. A parking symbol 24 configured to indicate that the switch 20 is an electric parking brake switch may be marked at the center of the knob 23.

The prism 30 may be installed within the switch 20, wherein one surface of the prism 30 may be exposed toward the operation space 12. The light source 40 may be installed at the lower end portion of the panel 10 and configured to emit the light. The light may be incident on a lower end surface of the prism 30. The light source 40 may be an LED lamp. The lighting system may further include a Printed Circuit Board (PCB) within which the light source 40 may be installed.

A portion of the light, which is incident on the lower end surface of the prism 30, may transmit through the prism 30 and exit from the upper end surface of the prism 30 and travel vertically upwards. The other portion of the light may refract within the prism 30 to be directed to the operation space 12, to allow the refracting light to travel toward the operation space 12.

For the presence of the prism 30, the light, which is emitted from the light source 40, may be configured to illuminate the upper end portion of the switch 20 and the operation space 12 due to the refraction within the prism. Therefore, the visibility of the operation space 12 of the switch 20 may increase during night driving or substantially low lighting. The present invention enables the driver to operate the switch 20 conveniently, leading to an improvement in product quality of switches.

Figure 4:
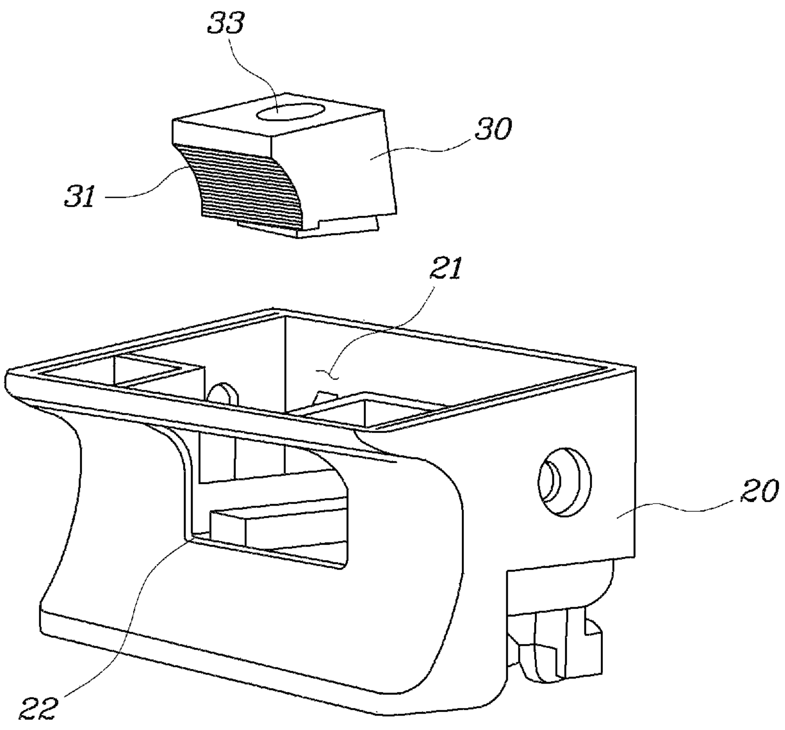
FIG. 4 is an exemplary diagram illustrating a switch and a prism, which are disassembled, according to an exemplary embodiment of the present invention.

Furthermore, since the light source 40, which is a same as the light source which has been used to illuminate a conventional switch, may be used without any change to illuminate the operation space 12, thus, installation of an additional light source is not necessary. FIG. 4 is an exemplary diagram illustrating the switch 20 and the prism 30, which are disassembled, according to the present invention, and FIG. 5 is an exemplary diagram illustrating a structure in which the switch 20 and the prism 30 are assembled.

Figure 5:
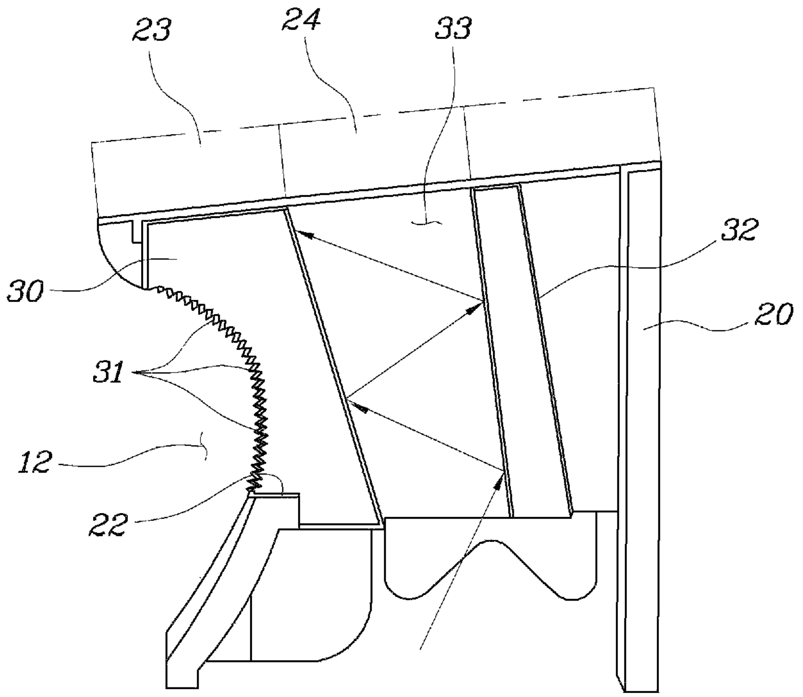
FIG. 5 is an exemplary diagram illustrating a structure, in which the switch and the prism are assembled, according to an exemplary embodiment of the present invention.

With reference to FIGS. 4 and 5, a plurality of linear protrusions 31 may be formed on the surface of the prism 30 which may be exposed towards the operation space 12. The linear protrusions 31 may be arranged to allow each linear protrusion 31 to extend in a lateral direction. The linear protrusions 31 may be formed to scatter and distribute the light, which is incident onto the surface on which the linear protrusions 31, to allow the light to travel toward the operation space 12. The light, which may be refracted within the prism 30, may be scattered by the linear protrusions 31 to substantially uniformly illuminate the operation space 12. Therefore, the lighting system may operate as mood lighting, which may improve aesthetics of vehicles.

According to the present invention, a barrier layer 32 may be disposed around substantially most of the surfaces of the prism 30. The barrier layer 32 may surround the prism 30 except for the upper end surface, the lower end surface, and the surface exposed to and facing the operation space 12.

To maximize the amount of light that reaches the operation space 12 and the parking symbol 24, the surfaces of the prism 30 may be covered with the barrier layer 32 of a black color. In other words, light loss may decrease due to the barrier layer 32. The barrier layer 32 may be an integrated layer formed through a coating process or an additional layer formed by attaching an arbitrary material to the prism.

The body of the switch 20 may have a hollow portion 21 that extends through the body of the switch 20 from the upper surface to the lower surface. An installation aperture 22 may be formed in a front part of the body of the switch to communicate with the hollow portion 21. The prism 30 may be inserted into the hollow portion 21 to fit a front end portion of the prism 30 to the installation aperture 22 and the outer surfaces of the prism 30 may be supported by interior surfaces of the installation aperture 22. The upper end portion of the prism 30 may protrude from the body of the switch and project into the operation space 12.

The prism 30 may be inserted into the switch 20 when it is assembled. Accordingly, there may be substantially minimal interference between parts when performing assembling work Therefore, the prism 30 may be more easily assembled with the switch 20.

The upper end portion of the prism 30 may protrude from the body of the switch and project into the operation space 12. Furthermore, the prism 30 may include protrusions 31 on the surface which is exposed towards the operation space 12. Therefore, when the switch 20 is operated to perform pivotal motion, the protrusions 31 may prevent the prism from slipping.

A cylinder like reflective aperture 33 may be formed to extend through the prism 30 from the upper end surface to the lower end surface. In this configuration, the light emitted from the light source 40 may reflect within the reflective aperture 33, and as a result, the light may travel vertically upwards.

Since the parking symbol 24 may be marked on the upper end portion of the prism 30, an upper end portion of the reflective aperture 33 may be formed to face the center of the parking symbol 24. In other words, the reflective aperture 33 tapers toward the bottom.

Since the parking symbol 24 may be marked at the center of the knob 23, when the light reflecting from the reflective aperture 33, which is a vertical aperture, deviates from the parking symbol 24, shading may be formed around the parking symbol 24. Thus, the upper end portion of the reflective aperture 33 may be disposed towards the parking symbol 24 to decrease the shading around the parking symbol 24.

In particular, the light emitted from the light source 40 may illuminate the upper end portion of the switch 20 and the operation space 12 of the switch 20 through the prism 30. Thus, the visibility of the operation space 12 of the switch 20 may improve during night driving and substantially low lighting, resulting improved operation convenience of the switch and quality of products.

In addition, according to the present invention, the light refracting within the prism 30 may be scattered by the protrusions 31 to illuminate the operation space 12. Therefore, the light may illuminate the interior of the operation space 12 substantially uniformly by traveling in all directions. Thus, the lighting system according to the present invention may operate as mood lighting, improving aesthetics of vehicles.

Further, according to the present invention, since the light source which has been used for conventional lighting for a switch may be used to illuminate the operation space 12, an additional light source and an additional PCB may be omitted, thus decreasing installation costs.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A lighting system for an electric parking brake switch, comprising:

a panel in which an installation space and an operation space, having an elongated opening shape, are formed;

a body of the switch disposed in an installation space and shaft coupled to two side surfaces of the installation space to perform pivotal motion;

a prism disposed within the switch, wherein the prism includes one surface exposed toward the operation space and is configured to allow light which enters from a bottom surface of the prism to pass therethrough and to travel vertically from an upper surface of the prism, and to allow light which enters from the bottom surface to refract within the prism and travel toward the operation space; and a light source disposed at a lower end portion of the panel and configured to emit light toward the prism.

2. The lighting system for an electric parking brake switch according to claim 1, further comprising:

a protrusion disposed on the one surface of the prism exposed toward the operation space, wherein the protrusion is configured to scatter and distribute the light which is incident on the protrusion to direct the light toward the operation space.

3. The lighting system for an electric parking brake switch according to claim 1, further comprising:

a barrier layer surrounding a portion of the prism.

4. The lighting system for an electric parking brake switch according to claim 1, further comprising:

a hollow portion formed in the switch to extend through a body of the switch from an upper end to a lower end;

an installation aperture formed in a front portion of the switch to communicate with the hollow portion, wherein the prism is inserted into the hollow portion and edges of the prism are supported by interior surfaces of the installation aperture, and an upper end portion of the prism protrudes from the front portion of the switch and projects into the operation space.

5. The lighting system for an electric parking brake switch according to claim 1, wherein a reflective aperture is formed to extend through the prism from the upper end surface to the lower end surface to allow the light emitted from the light source to reflect within the reflective aperture and travel vertically upward.

6. The lighting system for an electric parking brake switch according to claim 5, further comprising:

a parking symbol marked on an upper portion of the prism, wherein an upper end portion of the reflective apertures faces a center portion of the parking symbol.

* * * * *